United States Patent [19]
Buhrgard et al.

[11] Patent Number: 5,572,529
[45] Date of Patent: Nov. 5, 1996

[54] SIGNAL PROCESSING ARRANGEMENT

[75] Inventors: Karl S. M. Buhrgard, Stockholm; Tord L. Haulin, Uppsala, both of Sweden

[73] Assignee: Telefonaktiebolaget LM Ericsson, Stockholm, Sweden

[21] Appl. No.: 321,180

[22] Filed: Oct. 11, 1994

[30]    Foreign Application Priority Data

Oct. 12, 1993 [SE] Sweden .................................. 9303339

[51] Int. Cl.$^6$ ................................................ H04L 7/027
[52] U.S. Cl. ...................... 370/94.2; 370/105.3; 375/371
[58] Field of Search ........................ 370/60.1, 97, 100.1, 370/105.3, 108; 375/214, 354, 355, 371, 372, 373

[56]    References Cited

U.S. PATENT DOCUMENTS

| | | | |
|---|---|---|---|
| 4,387,466 | 6/1983 | Sire | 370/97 |
| 4,876,683 | 10/1989 | Suzuki | 370/97 |
| 5,107,488 | 4/1992 | Schreder et al. | 370/97 |
| 5,237,564 | 8/1993 | Lespagnol et al. | 370/60.1 |
| 5,359,605 | 10/1994 | Urbansky et al. | 370/105.3 |

FOREIGN PATENT DOCUMENTS

WO94/01945  1/1994  WIPO .

*Primary Examiner*—Benedict V. Safourek
*Attorney, Agent, or Firm*—Burns, Doane, Swecker & Mathis, L.L.P.

[57]    ABSTRACT

A signal processing arrangement processes an incoming bit position carrying signal and produces an outgoing bit position carrying signal. The arrangement comprises a signal processing unit for processing the incoming bit position carrying signal to produce an outgoing bit position carrying signal. The incoming bit position carrying signal is time-controlled in relation to a first clock signal. The outgoing bit position carrying signal is time-controlled in relation to the first clock signal. A second clock signal having the same frequency as the first clock signal is used for processing the incoming bit position carrying signal into a processed incoming bit position carrying signal within the signal processing unit. A synchronizing unit synchronizes processing for the signal processing unit by changing the time-relationship of clock pulses of the second clock signal to synchronize with the incoming bit position carrying signal. Buffer circuits store the processed incoming bit position carrying signal. The timing of the processed incoming bit position carrying signal can be changed to synchronize with clock pulses of the first clock signal before the processed incoming bit position carrying signal is output as the outgoing bit position carrying signal.

11 Claims, 2 Drawing Sheets

SIGNAL PROCESSING ARRANGEMENT

BACKGROUND

The present invention relates to a unit for processing electrical information-carrying signals, and then particularly, but not exclusively, to a unit which is adapted to process and/or handle signals which occur as bit positions in digital signals.

The invention is expected to find particular use in the telecommunications field, and then within signal systems in which information is presented in data packets or data cells, such as in an ATM system.

The signal processing unit according to the invention is based on the assumption that the bit positions of each incoming signal to be dealt with are time-controlled in relation to a first system-control clock signal or to system-control clock pulses which together form the clock signal, and wherein the bit positions of each signal outgoing from the unit are time-related precisely to the first system-control clock signal.

It will be understood from this that with regard to a system-control clock signal, the transmitted data signals must be synchronized exactly to the clock-signal clock pulses. Although it is unnecessary for the received signals to have this exact synchronism, these signals must nevertheless be related to the clock signal pulses and therewith related to the system.

Naturally, at least one or some, or perhaps all of the signal processing procedures require the presence of the clock pulses of a clock signal.

The present invention finds particularly suitable application when the clock signal and/or its clock pulses have a frequency above 100 Mb/s or Mhz.

Many different kinds of signal processing units of the afore-defined general kind and for the aforesaid technical field are known to the art.

Although it is expected that the present invention will find particular use in systems in which the signals are comprised of data packets, the following description will be made with reference to a multiplexing or demultiplexing unit adapted for data packets, for the sake of simplification.

A multiplexing/demultiplexing unit of this kind may be included in terminating units for switches or selectors that can be used in telecommunications systems.

When utilizing the multiplexing function of such a unit, received data cells that occur simultaneously on a number of lines at a first rate are series-parallel converted by control logic, parallel-stored in a memory and outputted at a second, higher rate through the medium of buffer circuits, parallel-series converters and clock pulse converters. Rate changes between standardized transmission rates, 155 Mb/s and 622 Mb/s are not unusual.

When practicing known techniques, received signals are processed internally within units of this kind, these signals being constantly adjusted time-wise so as to be related with sufficient accuracy to the clock pulses of a system-control clock signal generated in a master clock.

A constantly recurring problem when processing signals within these units is that the bit positions of the signals must always lie time-wise in phase with the clock pulses of the clock signal, and that there often occurs between these bit positions minor time discrepancies which must be adjusted and corrected through the medium of control circuits.

It is known to create through the medium of separate circuits conditions whereby the bit positions of the data signals can be shifted (delayed) slightly in time towards exact synchronism with the system-control clock pulses, prior to, during and/or subsequent to the internal signal processing procedure.

It is also known that this adaptation of the bit positions with a time-wise shift of the time positions of the bit positions towards exact synchronism requires comprehensive construction work.

Furthermore, a synchronizing circuit of this type which, with the aid of adaptable bit-position delay means, is intended to achieve synchronization between the bit positions and the synchronizing pulses is energy demanding and generates high power and therewith takes up a large silicon surface area of a silicon carrier.

The principle on which these procedures are based places narrow limits on the extent to which the individual bit positions can be corrected and are laden with difficulties in following varying delays in the time sections of the bit positions.

SUMMARY

When considering the known state of the art as described above, it will be seen that a technical problem resides in realizing the advantages that are afforded by simply refraining from synchronizing to the clock pulses of the system-controlling clock signal, i.e. the time-determining clock pulses of the master clock, internally within the unit, while carrying out the internal signal-processing procedures and nevertheless create provisions whereby each outgoing signal with its bit positions obtains exact synchronism with the clock pulses of the master clock on a unit belonging to the output connection.

It will also be seen that a technical problem resides in realizing the significance of accepting the fact that the bit positions of incoming signals need not necessarily be in exact synchronism with the clock pulses of the master clock while still being able to guarantee that the signal can be processed and handled correctly in the unit and that the signal will leave the unit in exact synchronism with the clock pulses of the master clock.

It will also be seen that another technical problem is one of realizing the significance of utilizing for unit-internal processing of received signals a "free" clock signal, and its clock pulses, which exhibits a clear or unequivocal time distance therebetween and which has a frequency which when forming mean values is equal to the clock-pulse frequency of the system-control clock signal, meaning that although the clock pulses of this clock signal have a clock pulse frequency which corresponds to the master clock frequency, the time positions and time relationships of the clock pulses are variable and can be adapted to the time-related bit positions of the signal.

In the case of a signal processing unit in which incoming signals are related time-wise to a first system-control clock signal and in which outgoing signals are exactly time-controlled in relation to the first clock signal, wherein a selected frequency assigned to the first clock signal is higher than 100 Mb/s, where signal-processing procedures carried out internally in the unit require the presence of bit position containing signals and the clock pulses of a clock signal, a technical problem resides in realizing those advantages that are afforded when the processing of signals internally in the unit are controlled by the clock pulses of a second system-related clock signal whose frequency is the same as the frequency of the first clock signal, wherein the synchronization necessary for the internal processing of said signal is achieved by changing the time-relationship of the clock pulses belonging to the second clock signal to synchronism with the bit positions of the signals, whereafter the thus processed signals can be stored in buffer circuits and the bit positions of the process signals can be changed time-wise to synchronism with said first clock signals before appearing as outgoing signals on the outgoing connection or connections of the unit, such as on a line or lines.

It will also be seen that a technical problem resides in realizing that the practical technical effects of the present invention are obtained when the bit positions and/or the clock pulses occur at a frequency which is greater than 150 Mb/s or 150 MHz.

Another technical problem is one of realizing that the aforesaid principles which solve one or more of the aforesaid technical problems can be applied to particular benefit on signals whose bit positions are coordinated to appear as data cells or data packets, particularly data cells having a structure which suits the ATM technique.

Still another technical problem is one of realizing the advantages that are afforded when the incoming signals are applied as input signals to a multiplexing/demultiplexing unit and outgoing signals occur as outgoing signals from said unit, whereby the bit positions of these outgoing signals lie in exact synchronism with the master clock or the system-control clock pulses and can thereby be transmitted with a time relationship that applies to the system as a whole.

With the intention of solving one or more of the aforesaid technical problems the present invention takes as its starting point a signal processing unit in which the bit positions of incoming signals are time-controlled in relation to a first system-control clock signal and its clock pulses, wherein the bit positions of the outgoing signal are time-controlled exactly in relation to the clock pulses of the first clock signal, and wherein the frequency allotted to the first clock signal exceeds 100 Mb/s and wherein the signal processing procedures carried out internally in the unit require the presence of time-related signals and the clock pulses of a clock signal.

According to the invention, internal processing of the bit positions of the signals in the unit is controlled by the clock pulses of a second clock signal, the clock pulses of a system-related clock signal, having the same frequency as the clock pulses of the first clock signal, wherein synchronization required for the internal signal processing procedure is effected by changing the time relationship of the clock pulses belonging to the second clock signal to synchronism with the bit positions of the signals, wherein the thus process signals can be stored in buffer circuits, wherein the time-controlled relationship of the process signals can be changed to synchronism with the clock pulses of said first clock signals prior to said clock pulses occurring as outgoing signals on an outgoing connection, such as one or more lines.

According to proposed embodiments, the frequency selected may exceed 150 Mb/s.

The signals may also occur as data cells or data packets, particularly data cells having a structure adapted to the ATM technique.

When the concepts of the invention are applied within a data cell technique, the incoming signals may be connected to a multiplexing/demultiplexing unit as input signals, and outgoing signals can occur as outgoing signals on said unit via outgoing connections.

Those advantages primarily afforded by an inventive signal processing unit reside in the ability to effect internal signal processing with the aid of a synchronizing signal or the clock pulses of a clock signal, whose time positions can be adapted to corresponding time positions for the bit positions of occurrent signals, and wherein upon completion of the signal processing procedures, the bit positions of the data signals are returned to synchronism with the system-controlling clock pulses of the master clock in a known manner. This enables a simpler synchronization principle to be used internally, because the time relationship of the internal clock signals or the internal synchronizing signal can be adapted to the time position of the bit positions within the signal.

BRIEF DESCRIPTION OF THE DRAWINGS

An exemplifying embodiment of a signal processing unit at present preferred and exhibiting significant features of the present invention will now be described in more detail with reference to the accompanying drawing, in which.

DETAILED DESCRIPTION

Figure 1:
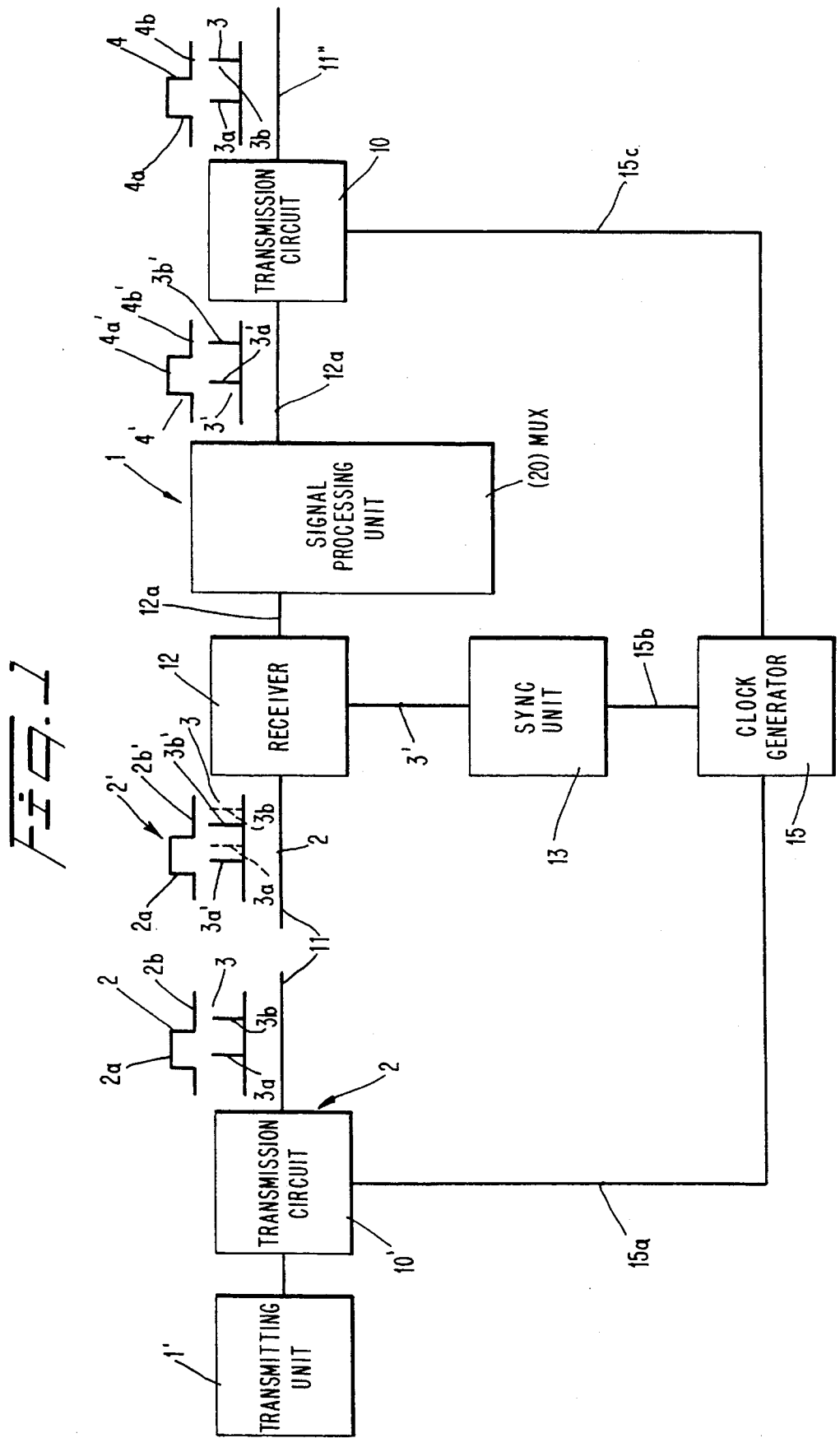
FIG. 1 is a block schematic of a unit included in a signal transmission system in which signal information exists in the form of data cells or data packets.

FIG. 1 illustrates a signal transmitting unit 1' which transmits signals 2 over a transmitter circuit 10' on a connection or line 11' in the form of bit position carrying signals.

The bit positions 2a, 2b of the signals 2 are related exactly in time to the clock pulses 3a, 3b of clock signals 3 generated in a master clock signal generator 15, such that the bit positions and the clock pulses are in synchronism.

The signal generator 15 generates a system-control clock signal comprising clock pulses 3a, 3b which are spaced at exactly the same time distance apart and occur at a frequency above 100 Mb/s.

The clock signal necessary for transmission in the transmission circuit 10' is delivered from the signal generator 15 over a line 15a.

Since the technique of transmitting the bit positions of an information carrying signal in synchronism with the clock pulses 3a, 3b of a clock signal with the aid of buffer circuits in the transmission circuit 10' is known to the art, this technique will not be described in detail here.

However, it is known that each signal transmission of bit positions over a connection includes a transit time, meaning that when a bit position is transmitted in synchronism with a clock pulse, the bit position has an unknown phase position in relation to the clock pulse upon reception.

It is assumed in the illustrated embodiment that when this signal 2 occurs as a signal 2' in a receiver circuit 12, the bit positions 2a' 2b' will no longer be in phase with the clock pulses 3a, 3b of the clock signal.

The bit positions 2a' and 2b' now occur on the connection 11 with an arbitrary phase in relation to the clock pulses 3a and 3b and the subsequent signal transmission will require correcting to synchronism with one clock pulse.

In this case, the bit positions 2a' and 2b' could be synchronized with the system-control clock pulses 3a, 3b in the same way as in the transmission circuit 10'.

However, this synchronization is achieved instead in accordance with the invention with the aid of an "internally" formed clock signal 3' which is applied to the receiver circuit 12 with said clock pulses 3a' and 3b' adapted and adjusted so as to occur in synchronism with the bit positions 2a' and 2b' on the connection 12a.

This internally formed clock signal 3' is "related" to the system-control clock pulses 3a, 3b insofar as the clock signal is assigned the same frequency as the clock pulses 3a, 3b, whereas the clock pulses 3a', 3b' of the clock signal 3' may be adjusted time-wise to synchronism with the time positions that are applicable to the received bit positions 2a', 2b'.

The signal 2' with the bit positions 2a' and 2b' and with the time positions of the clock pulses 3a' and 3b' adjusted to synchronism is now delivered to a signal processing unit 1 on the line or connection 12a.

It can be established from this that the signal 2' incoming to the unit 1 with its bit positions 2a' and 2b' was earlier time-controlled in the unit 1' and the transmission circuit 10' exactly in relation to the clock pulses 3a, 3b of the first clock signal 3, and the outgoing signal 4' with its bit positions 4a' and 4b' from the unit 1 can be assumed to be in synchronism with the system-related clock pulses 3a', 3b' but out of synchronism with the system-controlling clock pulses 3a, 3b.

The resultant signal 4' occurring on the connection 12a' and having the bit positions 4a', 4b' is therefore stored in a buffer circuit included in the transmission unit 10.

Bit positions 4a, 4b which are exactly time-controlled related to the system-controlling clock pulses 3a, 3b of the first clock signal 3 can be transmitted in a known manner on a connection 11" via a buffer circuit belonging to the transmission circuit 10.

The clock pulse frequency assigned internally to the first clock signal 3 exceeds 100 Mb/s and in the illustrated case has a standardized value of 155 Mb/s.

In accordance with the present invention, the signal processing carried out internally in the unit 1 is controlled by a generated second clock signal 3' which is given the same frequency as the first clock signal 3.

Synchronization required for the internal signal processing procedure is effected by changing, shifting the time-position of the clock pulse 3a' of the second clock signal 3' through a given, suitable time distance to achieve synchronism with the data signal 2'.

The thus processed data signal 4' can be stored in transmission or buffer circuits 10 and the bit positions 4a, 4b of the process data signals 4' are here assumed to be out of phase with the clock signal 3, this discrepancy being changeable to synchronism with said first clock signals 3 before they occur as outgoing data signals 4. This is described in more detail below with reference to FIGS. 2 and 3.

The clock pulses 3a, 3b of the clock signal 3 are generated in the generator 15 which serves as a master clock and which in a manner corresponding to the unit 10' synchronizes signals 4 outgoing from the transmission unit 10 to the connection 11" via a line 15c.

The clock pulses 3a, 3b of the clock signal 3 are also applied to a unit 13 through the medium of a line 15b.

This unit 13 functions to adapt a synchronization signal 3' generated therein to the time position of the bit positions 2a', 2b' of the occurrent digital signal 2' received by the receiver circuit 12 and is illustrated and described in International Patent Application No. PCT/SE93/00531.

It has been found that the inventive concept obtains particularly suitable application when the signals to be processed have the form of data cells or data packets, particularly data cells having a structure adapted to the ATM technique.

The signal processing unit 1 may be any suitable unit, although the unit is described below as a multiplexing unit.

Figure 2:
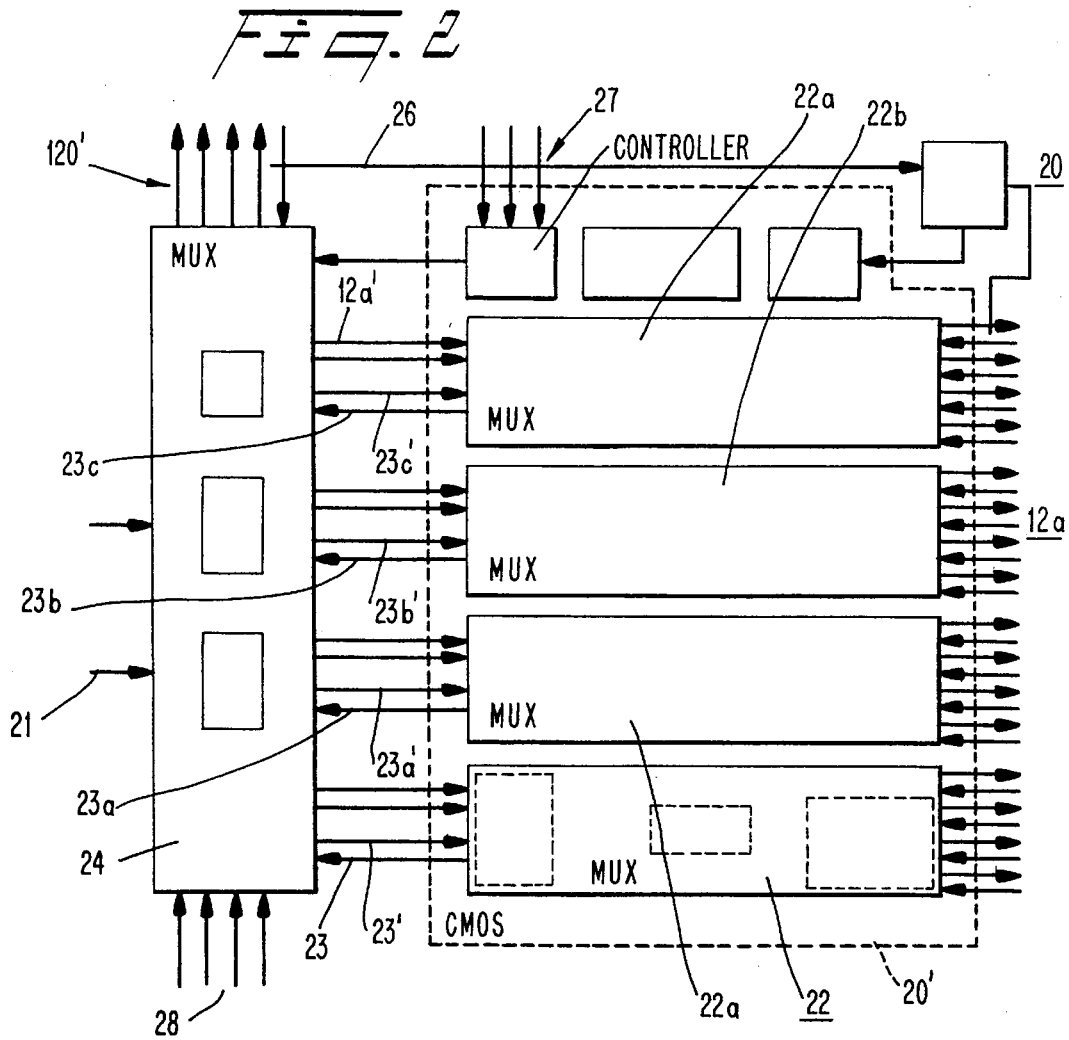
FIG. 2 illustrates a signal processing unit in the form of a multiplexing/demultiplexing block included in an ATM system.
Figure 3:
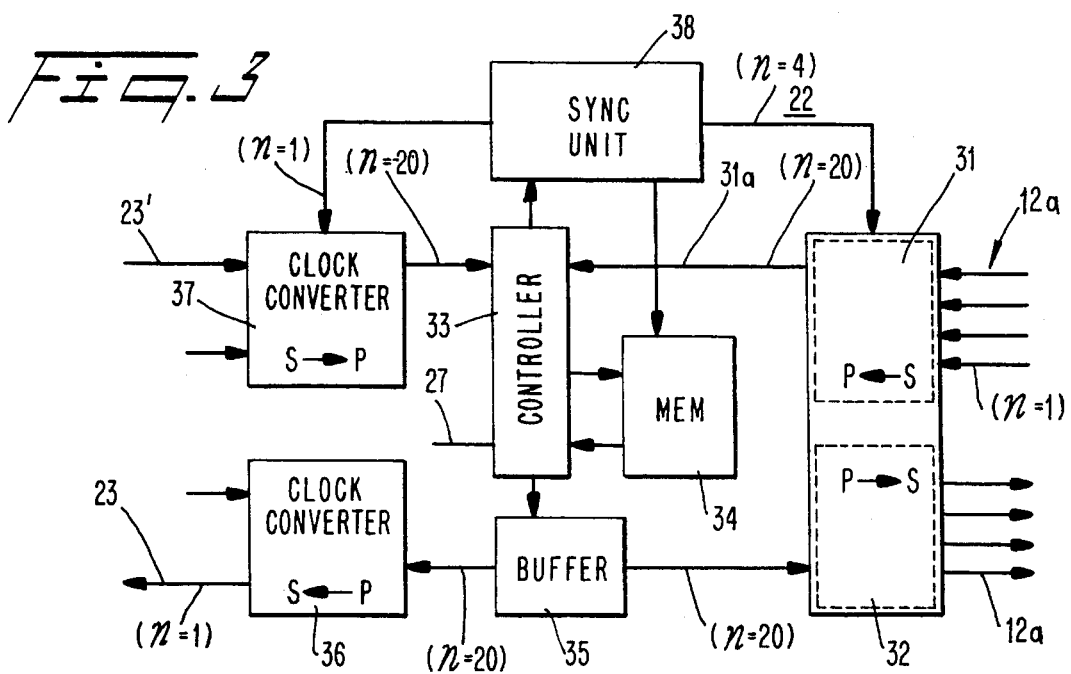
FIG. 3 illustrates one of several mutually identical signal processing sub-blocks in the unit shown in FIG. 2.

In this case, the signals 2' received on connections 11 may be applied after synchronization in the circuit 12 as input signals to a multiplexing unit 20 via the connection 12a, and outgoing signals 4 occur as outgoing signals 4' from the unit, as shown in more detail in FIGS. 2 and 3.

FIG. 2 is a block schematic which illustrates more clearly a multiplexing block 20 (and also a demultiplexing block in the opposite direction).

The block 20 is constructed on a digital Bi-CMOS circuit and utilizes a CMOS section 20' laid thereon and having four identical sub-blocks referenced 22, 22a, 22b and 22c.

The input 12a is comprised of four input lines for the sub-block 22, four input lines for the sub-block 22a, and so on, making a total of sixteen lines.

The sub-blocks 22–22c also include respective outgoing lines 23, 23a, 23b and 23c, which function as input lines to a further block 24.

The block 24 has four outputs 12a', which may be in direct connection with the lines 23, 23a, 23b and 23c.

Thus, all four output lines 23–23c form input lines to a fifth sub-block 24, which is principly constructed in the same way as the sub-blocks 22–22c.

The sub-block 24 also includes four input lines 28 the four output lines 12a', four output lines 120', four output lines 23', 23a', 23b', and 23c', and an output line 21 whose functions need not be explained in detail.

The sub-block 22 illustrated in FIG. 3 is adapted for a multiplexing (and also a demultiplexing) function, wherein with regard to the multiplexing function signals occurring on the input 12a at a speed of 155 Mb/s occur on the outputs 23 (12a') at a speed of 622 Mb/s.

Signals occur on the output 21 of the sub-block 24 at a speed of 2.5 Gb/s, although these are not used in the illustrated embodiment.

The signal stream moves in the opposite direction in the case of a demultiplexing function.

The sub-block 22 will be described in more detail with reference to the block schematic shown in FIG. 3.

In FIG. 3, the input lines 12a are represented by the four incoming lines shown in the Figure.

Each of the lines is adapted for a maximum data packet transmission rate of 155 Mb/s, the data packet having the form of ATM cells in the illustrated case.

The circuit 22 is able to transmit outgoing data signals at a frequency of 622 MHz on the line 23 and the connection 12a', with the aid of a series-parallel converter 31 and a memory 34, among other things.

As shown in FIG. 3, each of the input lines 12a of the sub-block 22 are connected to a series-parallel converter 31. The incoming digital signals on the lines 12a are thus subjected to a four-channel series-parallel conversion, wherein the signals arriving on parallel lines 31a are delivered to a control logic 33 and there processed at an internal rate.

The requisite synchronization is effected through the medium of a synchronizing unit 38 which receives signals from control logic 33.

Signals converted to a parallel format are delivered to a control block or control logic 33 and from there to a memory 34, a RAM memory. The stored information is delivered from the RAM memory or a ROM memory through the control logic 33 to a buffer circuit 35 which, in turn, delivers the information to a single-channel parallel-series converter and clock-pulse converter 36.

When converting in the opposite direction, or reverse sense, signals enter a single-channel series-parallel converter and clock-pulse converter 37 on the line 23', whereafter parallel format signals are sent to the control block 33, stored in the memory 34 and delivered in parallel form to the buffer circuit 35, from where they are delivered to a parallel-series converter 32 and fed out on the lines 12a".

The exemplifying embodiment illustrates the invention in the form of a functional block. Since such functional blocks are known to the art or can be constructed by the person skilled in this art without work of an inventive nature and on the basis of the general technology of this field and with the aid of obvious measures, these blocks have not been described in detail here.

With regard to the signals on the lines 27 in FIG. 2, it is assumed that parallel transmitted bit positions on the three lines of the relevant bit configuration points to a relevant conversion mode.

This bit configuration is transmitted to each of the control logic circuits, such as the circuit referenced 33, which therewith calculates and selects the requisite signal flow.

It should be noted that the clock pulse rate of the internal signal processing procedure is about 30 Mhz.

A circuit array or a unit of the aforesaid kind can be used to advantage in a unit which is illustrated and described in U.S. application Ser. No. 08/320,660, filed on Oct. 11, 1994, entitled "A Signal Receiving and Signal Transmitting Unit", or in a unit which is illustrated and described in U.S. patent application Ser. No. 08/320,658, filed on Oct. 11, 1994, entitled "Multiplexing/Demultiplexing Unit", or in an arrangement which is illustrated and described in U.S. patent application Ser. No. 08/320,661, filed on Oct. 11, 1994, entitled "A Synchronizing Circuit Arrangement".

Reference is made to these patent applications for a deeper insight of the application of the present invention and the contents of these patent applications are considered to form part of the present patent application.

It will be understood that the invention is not restricted to the illustrated and described exemplifying embodiment thereof and that this embodiment can be modified within the scope of the inventive concept as illustrated in the following Claims.

We claim:

1. A signal processing arrangement for processing an incoming bit position carrying signal and outputting an outgoing bit position carrying signal, the arrangement comprising:

a signal processing unit for processing the incoming bit position carrying signal to produce said outgoing bit position carrying signal, wherein the incoming bit position carrying signal is time-controlled in relation to a first clock signal, the outgoing bit position carrying signal is time-controlled in relation to said first clock signal, and a second clock signal having the same frequency as the first clock signal is used for processing said incoming bit position carrying signal into a processed incoming bit position signal within said signal processing unit;

a synchronizing unit for synchronizing processing within the signal processing unit by changing a time-relationship of clock pulses of the second clock signal to synchronize the second clock signal with the incoming bit position carrying signal; and buffer circuits for storing said processed incoming bit position carrying signal, wherein the timing of the processed incoming bit position carrying signal can be changed to synchronize with the first clock signal before the processed incoming bit position carrying signal is output as said outgoing bit position carrying signal.

2. The arrangement according to claim 1, wherein the first clock signal has a frequency exceeding 100 Mb/s, preferably exceeding 150 Mb/s.

3. The arrangement according to claim 1, wherein the incoming bit position carrying signal and the outgoing bit position carrying signal comprise data cells or data packets, particularly data cells having a structure adapted to an ATM technique.

4. The arrangement according to claim 1, wherein a plurality of incoming bit position carrying signals are input into the signal processing unit, a plurality of outgoing bit position carrying signals are output from the signal processing unit, and the signal processing unit further comprises a multiplexing/demultiplexing block into which said incoming bit-position carrying signals are applied and out of which said outgoing bit-position carrying signals are output.

5. The arrangement according to claim 2, wherein the incoming bit position carrying signal and the outgoing bit position carrying signal comprise data cells or data packets, particularly data cells having a structure adapted to an ATM technique.

6. The arrangement according to claim 2, wherein a plurality of incoming bit position carrying signals are input into the signal processing unit, a plurality of outgoing bit position carrying signals are output from the signal processing unit, and the signal processing unit further comprises a multiplexing/demultiplexing block into which said incoming bit-position carrying signals are applied and out of which said outgoing bit-position carrying signals are output.

7. The arrangement according to claim 3, wherein the signal processing unit further comprises a multiplexing/demultiplexing block into which said incoming bit-position carrying signal is applied and out of which said outgoing bit-position carrying signal is output.

8. The arrangement according to claim 4, wherein a plurality of incoming bit position carrying signals are input into the signal processing unit, a plurality of outgoing bit position carrying signals are output from the signal processing unit, and the signal processing unit further comprises a multiplexing/demultiplexing block into which said incoming bit-position carrying signals are applied and out of which said outgoing bit-position carrying signals are output.

9. Signal processing circuitry comprising:

a node for receiving an input signal;

a synchronizing circuit for synchronizing an internal clock signal to said input signal;

a processing circuit for processing said input signal using said internal clock signal as a reference and generating a processed signal; and an output circuit for receiving said processed signal and outputting an output signal which is synchronized to an external clock signal.

10. The circuitry of claim 9, wherein said input signal is synchronized to said external clock signal prior to reception at said node.

11. The circuitry of claim 9, wherein said internal and external clock signals have a same frequency.

\* \* \* \* \*